Aug. 15, 1961  J. C. DRADER  2,995,964
MACHINE
Original Filed Dec. 1, 1955  4 Sheets-Sheet 1
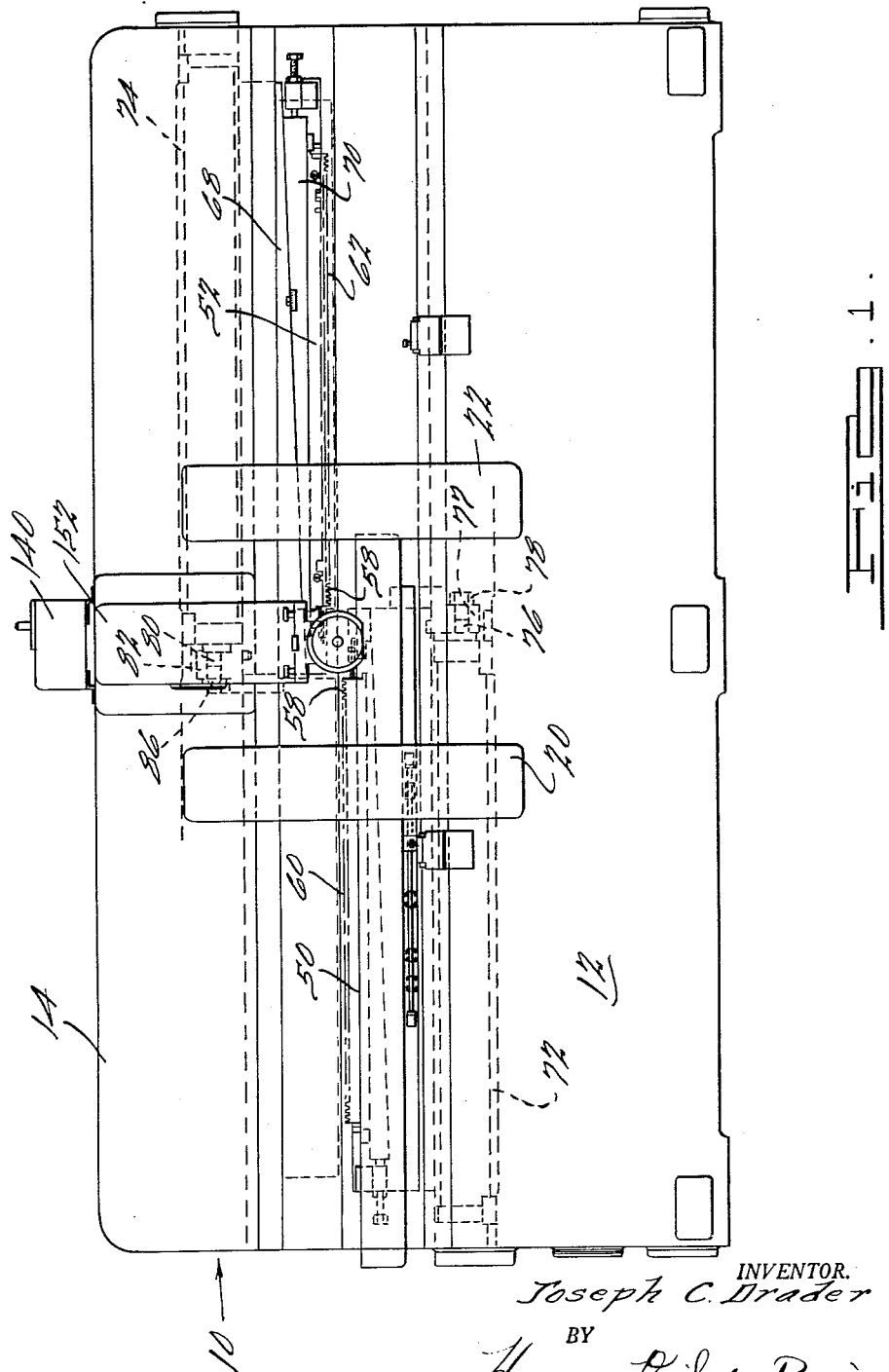
INVENTOR.
Joseph C. Drader
BY
Harness, Dickey & Pierce.
ATTORNEYS

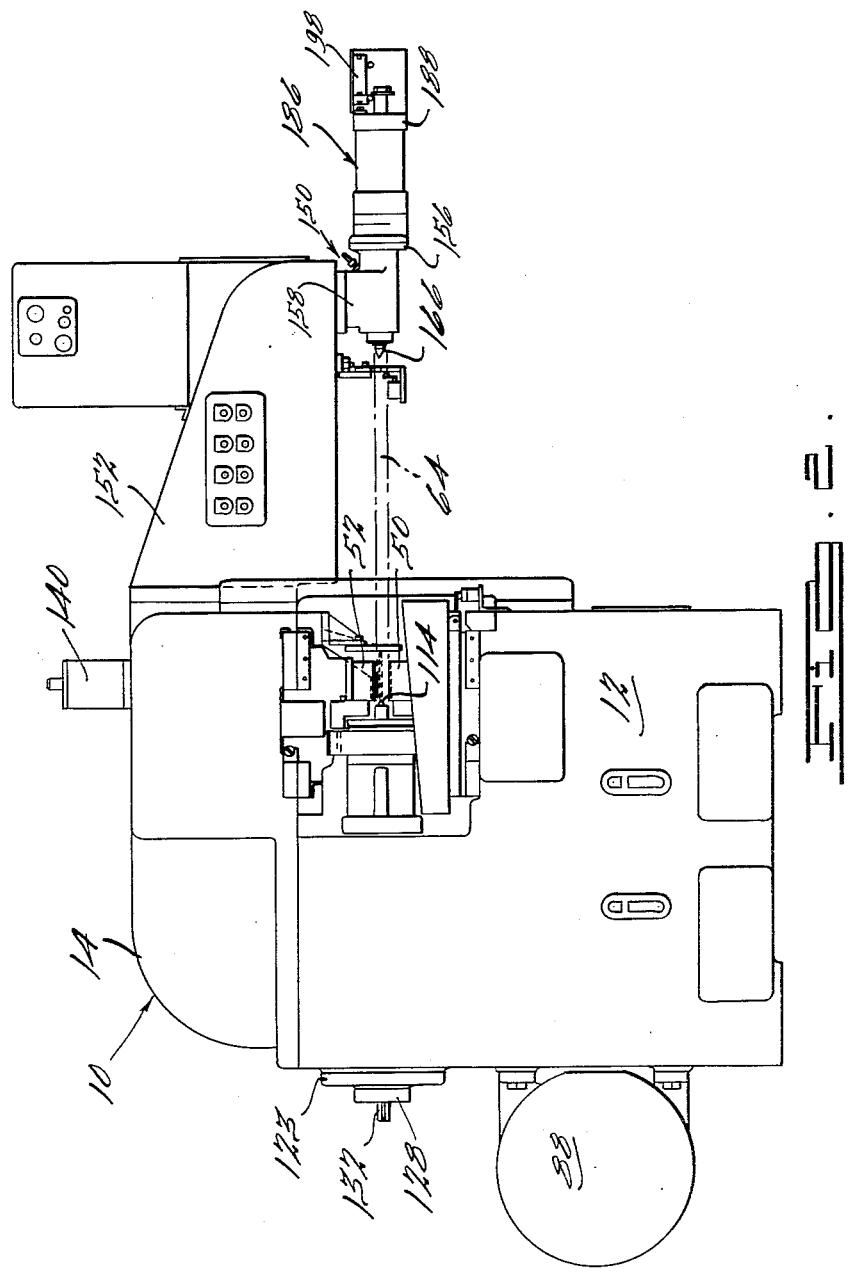

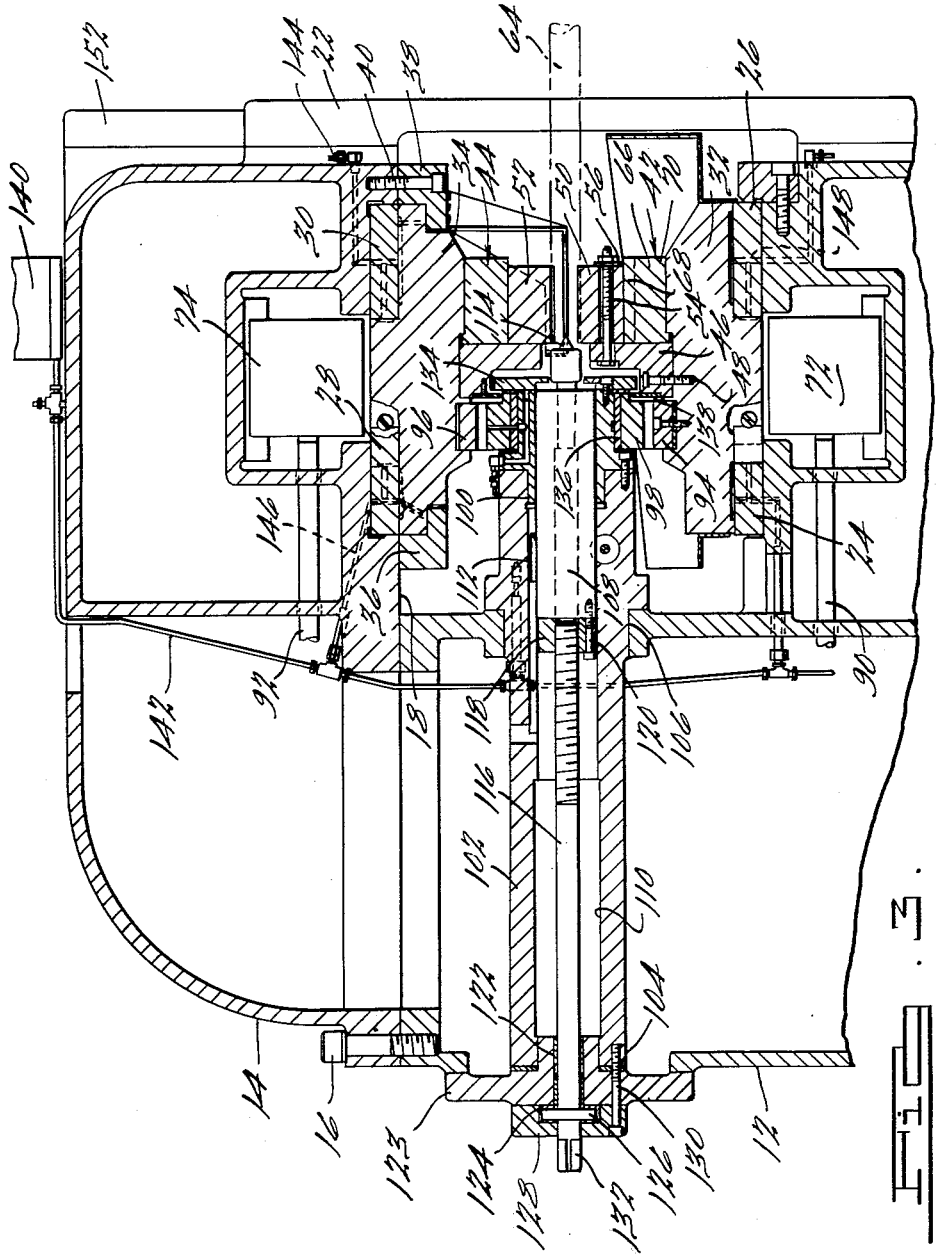

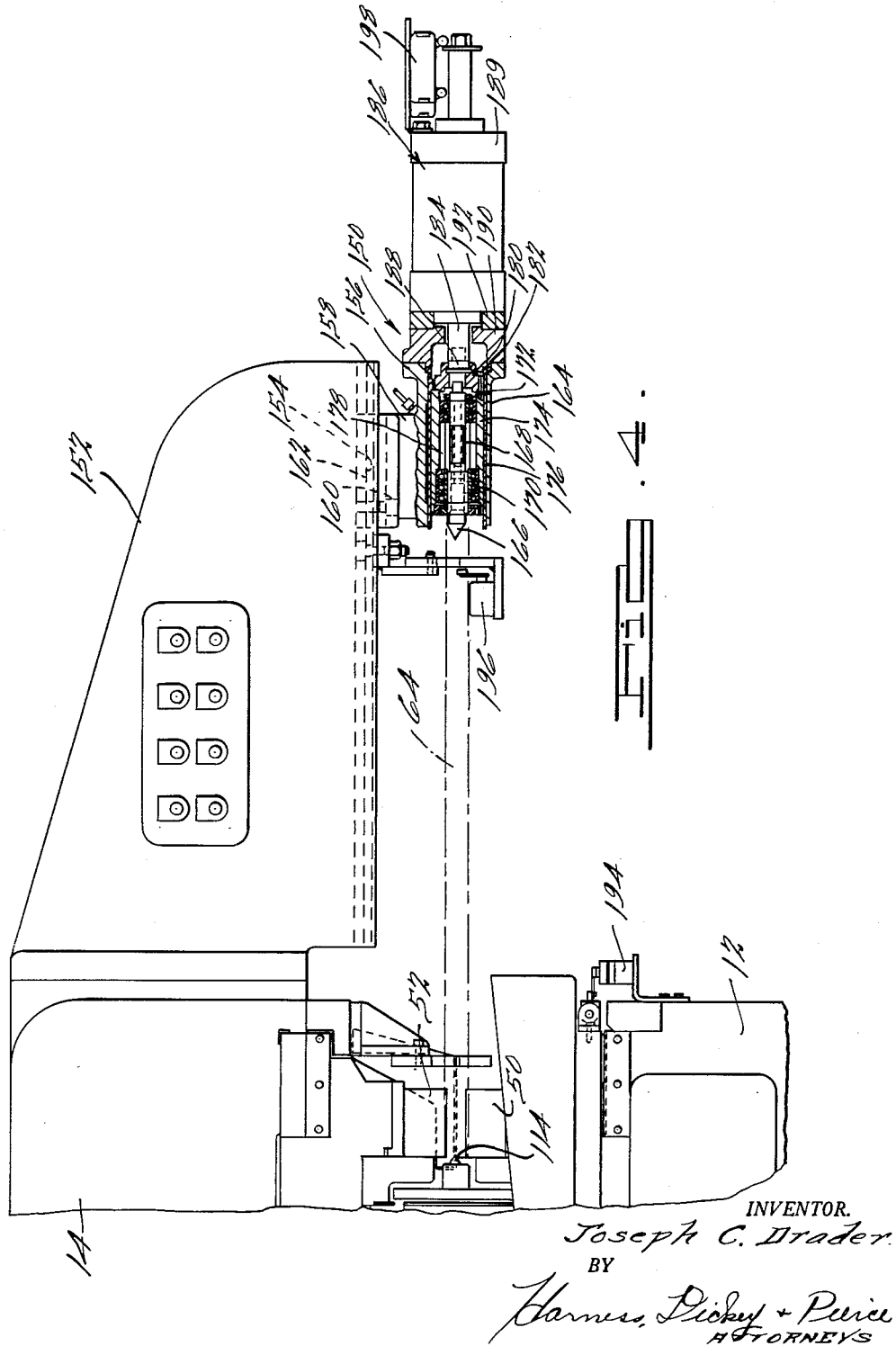

United States Patent Office 2,995,964
Patented Aug. 15, 1961

2,995,964
MACHINE
Joseph C. Drader, Ormond Beach, Fla., assignor to Michigan Tool Company, Detroit, Mich., a corporation of Delaware
Continuation of application Ser. No. 550,361, Dec. 1, 1955. This application Aug. 31, 1959, Ser. No. 837,262
2 Claims. (Cl. 80—20)

This invention relates to apparatus for forming toothed elements and, more particularly, to an improved machine for generating teeth on toothed elements, such as gears, splines and the like, and is a continuation of my copending application, Serial No. 550,361, filed December 1, 1955, now abandoned.

An object of the invention is to overcome disadvantages in prior machines of the indicated character and to provide an improved machine incorporating improved means for rapidly generating teeth on toothed elements, such as gears, splines and the like.

Another object of the invention is to provide an improved machine which facilitates the formation of teeth on toothed elements with a minimum of time, labor and expense.

Another object of the invention is to provide an improved machine for generating teeth on toothed elements incorporating improved means for controlling the tooth-forming tools.

Another object of the invention is to provide an improved machine for generating the teeth on toothed elements that is rugged in construction, economical to manufacture and assemble, durable, efficient and reliable in operation.

Another object of the invention is to increase the speed of production and improve the quality of toothed elements, such as gears, splines and the like.

Another object of the invention is to provide an improved machine which facilitates the generation of teeth on workpieces without the necessity of cutting or removing material from the workpieces and without requiring prior tooth-forming operations.

The above as well as other objects and advantages of the present invention will become apparent from the following description, the appended claims, and the accompanying drawings wherein:

FIGURE 1 is a front elevational view of a machine embodying the present invention;

FIG. 2 is an end elevational view of the machine illustrated in FIGURE 1;

FIG. 3 is an enlarged transverse sectional view of a portion of the machine illustrated in FIGURE 1; and FIG. 4 is an enlarged view, with portions in section, of the tailstock assembly of the machine illustrated in FIGURE 1.

The machine of the present invention facilitates the generation of teeth on workpieces without necessitating the cutting or removal of material from the workpieces and without requiring prior tooth-forming operations on the workpieces. In general, the machine of the present invention is adapted to subject a workpiece to the action of a pair of rack-type tools which moves simultaneously in opposite directions. The tools each have teeth conjugate to the teeth to be formed on the workpiece, and the tools pressure form teeth on the periphery of the workpiece by displacing the metal of the workpiece. Generation of the teeth on the workpiece may be accomplished when the workpiece is at ambient temperature or when the workpiece or a portion thereof is heated to an elevated temperature, as by the use of induction heating equipment, and when no prior tooth-forming operations have been performed on the workpiece.

Referring to the drawings, a machine, generally designated 10, is shown, embodying the present invention. The machine 10 is comprised of a lower base 12 and an upper base 14 which is fixed to the lower base 12, as by bolts 16. The lower base 12 and the upper base 14 are preferably heavy and rigid and define an elongate throat 18 which is generally C-shaped in transverse cross section. In order to increase the rigidity of the machine 10, a pair of tie bars 20 and 22 are provided, the lower end portions of the tie bars 20 and 22 being fixed to the lower base 12 while the upper end portions of the tie bars are fixed to the upper base 14.

A pair of spaced substantially parallel lower slide ways 24 and 26 are provided which are fixed to the lower base 12, and a pair of spaced substantially parallel upper slide ways 28 and 30 are provided which are fixed to the upper base 14. The ways 24 and 26 and the ways 28 and 30 are disposed in vertically spaced confronting relationship in the throat 18 of the machine with the bearing surfaces thereof disposed in substantially parallel planes. A lower slide member 32 is provided which is mounted for reciprocation on the lower slide ways 24 and 26, and an upper slide member 34 is provided which is mounted for reciprocation on the upper slide ways 28 and 30, the upper slide member 34 being retained by a pair of retaining members 36 and 38 fixed to the upper base 14, as by bolts 40.

A pair of tool holders 42 and 44 are provided which are fixed to the lower and upper slide members 32 and 34, respectively. In the embodiment of the invention illustrated, the tool holders 42 and 44 each include a body portion 46 which is fixed to the associated slide member, as by bolts 48. The tool holders 42 and 44 are adapted to retain a pair of substantially identical rack-type tooth-forming tools 50 and 52 that are fixed to the tool holders 42 and 44, respectively, by bolts 54 which pass through the tools and the body portion 46 of the tool holders and are retained by nuts 56. For the purposes of the present invention, it is sufficient to state that the tools 50 and 52 are provided with teeth 58 on the working faces 60 and 62 thereof. The spacing between the working faces 60 and 62 of the tools is less than the diameter of the workpiece 64, or the diameter of that portion of the workpiece upon which teeth are to be formed, and the shape of the faces 60 and 62 of the tools is impressed or conjugated on the periphery of the workpiece as the tools move relative to the workpiece. The spacing of the working faces 60 and 62 of the tools is regulated so that the depth of the impression made in the workpiece gradually increases as the tooth-forming operation proceeds, the faces 60 and 62 approaching closer together in a horizontal plane through the axis of the workpiece as the tools move relative to the workpiece. The taper can be obtained, for example, by inclining the pitch lines of the tool teeth, by gradually increasing the height of the tool teeth while holding the pitch line level, or by a combination of the two methods.

In order to facilitate adjusting the distance between the working faces 60 and 62 of the tools, each of the tool holders 42 and 44 is provided with an adjustable gib portion 66 which is interposed between the tool and the associated slide member. As shown in FIGURE 1, the gib portion 66 of each of the tool holders includes mating sections 68 and 70 having mating tapering surfaces therebetween. With such a construction, longitudinal movement of one section of the gib portion of each tool holder relative to the other section thereof effects vertical movement of the associated tool 50 or 52.

In order to drive the slide members 32 and 34 and, consequently, the tools 50 and 52 simultaneously in opposite directions, a pair of hydraulic piston and cylinder units 72 and 74 are provided which are fixed to the lower and upper bases 12 and 14, respectively. The hydraulic piston and cylinder unit 72 includes a piston rod 76 which is fixed to an outwardly projecting portion 77 of the lower slide member 32, as at 78, while the piston and cylinder unit 74 includes a piston rod 80 which is fixed to an outwardly projecting portion 82 of the upper slide member 34, as at 86. The piston and cylinder units 72 and 74 are substantially identical in size and are connected to a common source of fluid pressure, such as the hydraulic pump unit 88, by inlet and outlet conduits, such as 90 and 92, a suitable control valve being interposed between the piston and cylinder units 72 and 74 and the common source of fluid pressure 88 to facilitate controlling the units 72 and 74 simultaneously. Since the piston and cylinder units 72 and 74 are connected to a common source of fluid pressure, the slide members 32 and 34 are actuated and moved at the same instant and at the same velocity in opposite directions, the common source of hydraulic pressure hydraulically interlocking the units 72 and 74.

In order to insure the synchronization of the slide members 32 and 34, a pair of driving rack members 94 and 96 are provided which are fixed to the slide members 32 and 34, respectively, and which extend in spaced substantially parallel relationship with respect to the tools 50 and 52, respectively. The driving rack members 94 and 96 mesh simultaneously with a drive gear 98 mounted for rotation on a bracket 100 fixed to a spindle support member 102, the spindle support member being secured to the lower base, as at 104 and 106. A spindle sleeve 108 is provided which extends longitudinally of a passageway 110 defined by the support member 102, and the spindle sleeve 108 is keyed to the spindle support member by a key 112 in order to prevent rotation of the spindle sleeve 108 relative to the spindle support member 102. A center 114 is provided which is mounted in one end portion of the spindle sleeve 108, the center 114 projecting into the throat of the machine 10 and terminating at a position adjacent the tools 50 and 52. In order to facilitate adjusting the center 114, an elongate screw 116 is provided, one end portion of which threadably engages a nut 118 fixed to the spindle sleeve 108, as by bolts 120. The opposite end portion of the screw 116 extends through a sleeve bearing 122 mounted in an end cap 123. A thrust bearing 124 is provided which engages an annular shoulder 126 provided on the screw 116, the assembly being retained by a clamping ring 128 which is secured to the support member 102, as by bolts 130. The end portion 132 of the screw 116 projects through the clamping ring 128 and is preferably provided with non-circular wrench engaging surfaces which facilitate turning the screw, as with a wrench. With such a construction, rotation of the screw 116 in one direction advances the spindle sleeve 108 and the center 114 toward the tools 50 and 52 while rotation of the screw 116 in the opposite direction retracts the spindle sleeve and the center 114 from the tools 50 and 52.

At a position adjacent the center 114, an end cap 134 is provided which serves to retain the driving gear 98 and a bearing 136 interposed between the driving gear and the bracket 100, the end cap 134 being secured to the bracket 100 by bolts 138.

A lubricant reservoir 140 is provided which is mounted on top of the upper base 14, as viewed in FIG. 1, the lubricant flowing from the reservoir 140 through conduits, such as 142 and 144, which communicate with ducts, such as 146 and 148, leading to the bearing surfaces of the upper and lower slide members 32 and 34, as well as to the teeth of the driving gear 98 and other bearing surfaces of the machine 10.

A tailstock assembly, generally designated 150, is provided which is mounted on a cantilevered support arm 152, one end of which is fixed to the upper base 14, the support arm 152 extending outwardly from the upper base 14 and defining ways 154. The tailstock assembly 150 also includes a tailstock 156 having an upwardly projecting flange portion 158 mounted for sliding movement on the ways 154, the tailstock being retained in the selected adjusted position on the ways 154 by screws 160 which threadably engage a clamping nut 162. The tailstock 156 also includes a body portion 164, and a tailstock center 166 is provided which is mounted in a spindle 168 which extends through the body portion 164 of the tailstock and which is supported by bearings 170 and 172. The bearings 170 and 172, in turn, are mounted in a sleeve 174 which is mounted for reciprocation in a bushing 176 carried by the body portion 164 of the tailstock, a suitable spacer 178 being interposed between the bearings 170 and 172. An end cap member 180 is provided which is fixed to the sleeve 174, as by bolts 182. The cap member 180 is fixed to the piston rod 184 of a piston and cylinder unit 186 by a bolt 188 which extends through the cap member 180 and threadably engages the piston rod 184. The casing 189 of the unit 186 is secured to the body portion 164 of the tailstock by adapters 190 and 192 interposed between the casing 189 and the body portion of the tailstock. With such a construction, actuation of the piston and cylinder unit 186 in one direction causes the sleeve 174 and the tailstock center 166 to move longitudinally of the tailstock 156 toward the tools 50 and 52, while actuation of the piston and cylinder unit 186 in the opposite direction serves to retract the tailstock center 166 from the workpiece.

The hydraulic piston and cylinder units 72 and 74, and the piston and cylinder unit 186 are controlled by limit switches, such as 194, 196 and 198 which, in turn, control electrical circuits which serve to actuate solenoid valves interposed between the piston and cylinder units and the source of fluid pressure, thereby actuating the piston and cylinder units 72 and 74 and the piston and cylinder unit 186 as a function of the movement of the slide members 32 and 34 and the tailstock center 166, respectively.

In the operation of the machine 10, a workpiece 64 is inserted in the throat 18 of the machine with the longitudinal axis of the workpiece aligned with the centers 114 and 166, and the piston and cylinder unit 186 is actuated so as to advance the center 166 so that the workpiece is supported for rotation between the centers 114 and 166. The hydraulic piston and cylinder units 72 and 74 are then actuated so as to drive the tools 50 and 52 simultaneously and at the same speed in opposite directions. Since the spacing between the working faces 60 and 62 of the tools 50 and 52 is less than the diameter of the workpiece, the shape of the faces 60 and 62 of the tools is impressed or conjugated on the periphery of the workpiece. As previously mentioned, the spacing between the working faces of the tools is initially adjusted so that the depth of the impression made in the workpiece gradually increases as the tools move relative to the axis of the workpiece, the faces 60 and 62 moving closer together in a horizontal plane through the axis of the workpiece as the length of the stroke increases. The end of the stroke is reached when the trailing ends of the tools pass over the workpiece. It is preferred to remove the workpiece from between the centers before returning the tools to the initial starting position illustrated in FIGURE 1, the piston and cylinder unit 186 being actuated to retract the tailstock so as to enable the workpiece to be removed from between the centers after which the hydraulic piston and cylinder units 72 and 74 are actuated to return the tools to the starting position. Another workpiece may then be inserted between the centers 114 and 166, and the cycle repeated.

While a preferred embodiment of the invention has been shown and described, it will be understood that various changes and modifications may be made without departing from the spirit of the invention.

What is claimed is:

1. In a machine for generating gear teeth and the like, the combination including means for supporting a workpiece for free rotation about a fixed axis, a pair of slide members mounted in spaced substantially parallel relationship on opposite sides of said workpiece supporting means for rectilinear movement transversely of said axis, each of said slide members being adapted to carry a rack-type tooth generating tool for simultaneous engagement with the workpiece, a pair of hydraulic piston and cylinder units, one of said piston and cylinder units being connected to one of said slide members and the other of said piston and cylinder units being connected to the other of said slide members, said piston and cylinder units each being connected to a common source of fluid pressure for operating said slide members simultaneously in opposite directions, a pair of racks having identical teeth thereon, one of said racks being fixed to one of said slide members and the other of said racks being fixed to the other of said slide members, and gear means mounted for rotation about said axis and meshing with said pair of racks for synchronizing the movement of said slide members under said fluid pressure to insure precision meshing of the teeth of the generating tool with respect to the teeth being formed on the workpiece.

2. The combination according to claim 1, said workpiece supporting means comprising a head center and a tailstock.

References Cited in the file of this patent

UNITED STATES PATENTS

| | | |
|---|---|---|
| 458,685 | Morris | Sept. 1, 1891 |
| 1,220,369 | Slick | Mar. 27, 1917 |
| 1,622,169 | Zidovec | Mar. 22, 1927 |
| 2,584,789 | Clark | Feb. 5, 1952 |
| 2,679,177 | Gepfert | May 25, 1954 |

FOREIGN PATENTS

| | | |
|---|---|---|
| 898,436 | Germany | Nov. 30, 1953 |
| 942,804 | Germany | May 9, 1956 |
| 409,622 | Italy | Feb. 23, 1945 |